Jan. 6, 1970 H. SEITER 3,488,712

METHOD OF GROWING MONOCRYSTALLINE BORON-DOPED SEMICONDUCTOR LAYERS

Filed June 23, 1965 2 Sheets-Sheet 1

United States Patent Office 3,488,712
Patented Jan. 6, 1970

3,488,712

METHOD OF GROWING MONOCRYSTALLINE BORON-DOPED SEMICONDUCTOR LAYERS

Hartmut Seiter, Munich, Germany, assignor to Siemens Aktiengesellschaft, a German corporation Filed June 23, 1965, Ser. No. 466,210
Claims priority, application Germany, June 26, 1964, S 91,724
Int. Cl. H01l 7/36, 7/62
U.S. Cl. 148—175 5 Claims

ABSTRACT OF THE DISCLOSURE

Described is an improvement in epitaxial techniques for growing monocrystalline homogeneously boron-doped semiconductor layers on a monocrystalline substrate by thermal dissociation of vapors of a compound of said semiconductor material and of gaseous decaborane in a reaction chamber and precipitating the dissociated semiconductor material and boron onto a heated substrate in the reaction chamber. The improvement comprises forming outside of the reaction chamber a solution of decaborane in a liquid compound of said semiconductor material, vaporizing the thus formed solution, and supplying the resulting vapors of said solution into the reaction chamber.

My invention relates to a method of growing monocrystalline boron-doped semiconductor layers, and more particularly to an epitaxial method of growing homogeneous monocrystalline boron-doped semiconductor layers, such as of silicon or germanium.

Still more particularly, the invention relates to the growing of monocrystalline, homogeneously boron-doped epitaxial layers, particularly of silicon or germanium, on monocrystalline substrates by the thermal decomposition of a gaseous compound of the semiconductor material to be precipitated and of a gaseous boron compound in a reaction chamber, and precipitation of the semiconductor material and of the boron on one or more heated substrates in the reaction chamber.

It has been necessary until now, for the doping with boron of a silicon or germanium epitaxial layer precipitated from the gaseous phase, to use boron trichloride ($BCl_3$) as the boron-supplying compound and to introduce the compound into the reaction chamber by means of carrier gases. The carrier gas was conducted through a vessel containing the boron compound in liquid condition. The carrier gas is thus charged with the boron trichloride vapors.

This method has the great disadvantage that the boron trichloride is extremely sensitive to moisture. The slightest traces of water cause decomposition of the boron trichloride with the formation of boric acid and hydrogen chloride.

Moreover, it is not possible by this method to always produce homogeneously doped crystals, since this method requires introduction of the compound of the semiconductor material and the boron compound from two separate vessels, and these two vessels cannot be maintained, during the entire course of the precipitation process, at constant temperatures, except with the greatest of technical difficulties. Slight temperature variations in the vessels directly result in displacement of the concentration ratios of the vapors in the carrier gas, thus immediately causing an appreciable change in the doping concentrations of the precipitating semiconductors. Moreover, it is necessary to maintain the flow rate of the carrier gases in the two vessels during the entire precipitation process at a single predetermined value, which is extremely difficult, and in fact, up to the present time could not be carried out in any technically satisfactory method.

The known methods require using as the boron source a solid, pulverized boron compound. This necessitates providing two separate evaporators, one for the boron compound and one for the compound of the semiconductor material, so that the above described disadvantages are also present in such process.

Still further, it is extremely difficult, if not impossible, to obtain reproducible, definite boron concentrations by the known methods because the speed of evaporation of the solid substances depends very strongly on the size of the surface and on the surface condition of the substances. Attempts to avoid these difficulties by adjustment of the saturation vapor pressure of the solid boron compound results in mainly undesirably high boron concentration in the gas phase, and therefore in the precipitated semiconductor material.

It is accordingly, a primary object of my present invention to provide a method for the growing of monocrystalline homogeneously boron-doped semiconductor layers which avoid all of the above enumerated difficulties of the known methods.

It is yet another object of my present invention to provide a method which provides reproducible homogeneously boron-doped semiconductor layers, particularly of silicon or germanium, while reducing the need for controls which were necessary according to the prior art and which even when used still did not provide true homogeneity of the produced layers.

Other objects and advantages of the invention will be apparent from a further reading of the specification and of the appended claims.

With the above and other objects in view, my invention mainly comprises in the epitaxial method of growing monocrystalline homogeneously boron-doped semiconductor layers, particularly of silicon or germanium, on monocrystalline substrates, by the thermal dissociation of a gaseous compound of the semiconductor material and the gaseous boron compound and the precipitation of the resulting semiconductor material and boron onto a heated substrate, the improvement which comprises the subjecting of the heated substrate to vapors of a solution of decaborane dissolved in the semiconductor compound.

In achieving the objects and advantages of the invention, it is preferred to dissolve decaborane outside of a reaction chamber in the semiconductor compound while the latter is in liquid state, to vaporize the thus obtained decaborane solution, to supply the resulting vapor into the reaction chamber, and in the reaction chamber to thermally dissociate the vapors so as to precipitate the semiconductor material and the boron onto a heated substrate which is maintained in the reaction chamber.

Homogeneously boron-doped semiconductor crystals are easily obtained by following the above described process. A further advantage of this method is that it is possible to obtain reproducible, definitely chosen doping concentrations, which is particularly desirable with relatively high ohm semiconductor layers of specific resistance greater than 0.1 ohm·cm.

The evaporation of the decaborane and the compound of the semiconductor material to be separated, proceeds from a single evaporation vessel. This avoids uncertainties which would result from temperature fluctuations. Likewise, slight variations from the beginning of the separation process in the speed of the stream of the used carrier gas, for example hydrogen, does not result in changes in the resistance of the resulting crystal since the ratio of boron to the precipitated semiconductor material in the gas phase is not influenced thereby.

Decaborane ($B_{10}H_{14}$) is an easily obtainable solid substance with a melting point of 99.3° C. and a boiling point of 213° C. The solubility of decaborane in silicon tetrachloride, for example, amounts at +25° C. to about 0.5% by weight, at −25° C. to about 0.05% by weight; in silicochloroform at +25° C. to about 1% by weight, and at −40° C. to about 0.1% by weight.

One manner of carrying out the method of the present invention is to first produce a relatively concentrated stock solution of decaborane in the semiconductor material to be precipitated, the semiconductor material being in liquid condition, for example a 0.1% by weight solution. Portions of this stock solution are then, depending on the desired resistance of the layer to be produced, diluted with the semiconductor material compound and this dilute mixture is then evaporated, and preferably with the aid of a carrier gas carried into the reaction chamber.

The substrate is arranged in the reaction chamber and there heated to a precipitation temperature. The substrate may be in filament or wire form, and is preferably held at its ends. Obviously, it is possible to have several of these substrates arranged in the reaction chamber, and also to have substrates of any shape, such as plates, sieves, etc.

The substrate or carrier body can consist of the material of the semiconductor material to be precipitated and if desired, it can be already boron-doped, for example, it can have the same boron concentration as in the desired layer to be produced.

The carrier can also consist of a material different from the layer to be precipitated thereon. The materials, must however, in this case exhibit along with the monocrystalline structure of the layer to be precipitated, also exhibit the same lattice structure and also to have as close as possible the same lattice constants.

It is apparent that the carrier material must have a melting point higher than the precipitation temperature of the material to be precipitated thereon.

Basic investigations with respect to the invention have resulted in the observation that with respect to the concentration ratios of the decaborane to the compound of the semiconductor material in the solution, it is not possible to calculate the partial pressure of the decaborane above the solution from the decaborane in the semiconductor material in liquid condition. Thus, the solution does not follow Raoult's law, according to which the partial pressure $p_2$ of a dissolved substance above a solution of this substance is proportional to the concentration of the dissolved substance, that is the ratio of the number of dissolved mols of the substance is proportional to the volume of the solution. The analytical determination of the decaborane content in the gas phase always gives values which are at variance with the values calculated according to Raoult's law.

Even if the starting ratio of boron to the semiconductor material at the starting and the constantly maintained precipitation temperature possesses a value of 1 (the unity value), that is corresponding to the given ratio in the gas phase, it is not possible to calculate the doping concentration and thereby the specific resistance of the precipitated semiconductor layer based upon the weight in quantity of the decaborane in the solution. It has been found that the starting ratio of 1 with silicon is first obtained when the ratio of boron to silicon in the gas phase is less than $10^{-5}$.

Consequently, in order to produce semiconductor layers with definite, specific resistances, in accordance with the method of the present invention, a calibration curve is prepared. In order to arrive at this curve, several definite solutions with different concentrations of decaborane in a predetermined amount of the semiconductor are produced, for example to precipitate silicon layers definite solutions of decaborane in silicochloroform or in silicon tetrachloride are taken. From the various solutions, semiconductor layers are produced at predetermined precipitation temperatures, and doping concentration is then determined by measurement of the conductivity. The obtained values are used for the calibration curve. Obviously, the curves can be obtained in the case of any semiconductor material and for different concentrations, and from these curves anyone can himself arrive at the conditions necessary, that is with respect to concentration, for producing semiconductor layers of predetermined resistance.

If it is only desired that the semiconductor layer have an exact homogeneous doping distribution without a desired definite doping concentration, then it is not necessary to prepare any calibration curve.

With the aid of a calibration curve it is possible to obtain layers with a specific resistance which corresponds exactly to the resistance of the carrier body or substrate. This is advantageous if, for example, it is desired to have a filamentous carrier coated with the same semiconductor material and then by cuts vertical to the axis divided into discs. Likewise, it is possible to precipitate layers of differing, definite specific resistance on the substrate body.

The upper range of the boron-doping according to the method of the present invention, is, depending upon the degree of solubility of the decaborane in the selected semiconductor compound, about $$N=5\times10^{17}$$

wherein N is the number of boron atoms per one gram-atom, that is $6.02\times10^{23}$ atoms of the semiconductor material. This doping concentration corresponds to a specific resistance of about 0.1 ohm·cm. The evaporation temperature is maintained at between about −20 and −40° C. The method is therefore particularly suitable for the production of high ohm semiconductor layers having a resistance of greater than 0.1 ohm·cm.

The invention is illustrated by way of example in the accompanying drawings, which form part of the application in which.

Figure 1:
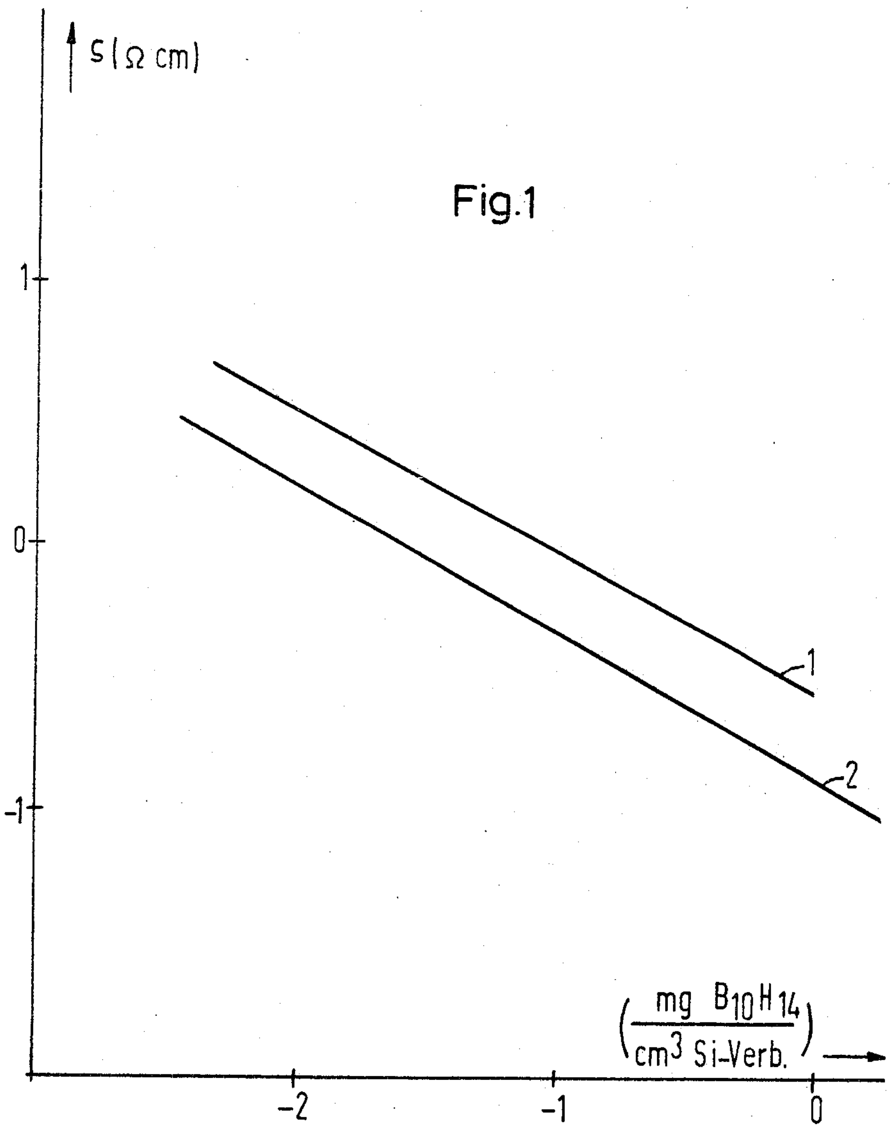
FIG. 1 shows two logarithmic calibration curves.

In FIG. 1, curve 1 shows a logarithmic execution of a calibration curve in which the specific resistance $\sigma$ of monocrystalline silicon layers are given [in ohm·cm.] in relationship to the concentration of the decaborane in liquid silicon tetrachloride:

$$\left[\frac{\text{mg. } B_{10}H_{14}}{\text{cm}^3\text{. } SiCl_4}\right]$$

when the separation temperature is maintained at about 1150° C. and the mol ratio of $SiCl_4$ to the used hydrogen carrier gas is maintained at 0.01.

Curve 2 gives the value of the specific resistance $\sigma$ for a solution of decaborane in silicochloroform when the same working conditions are maintained. From the two curves it is easy to determine which concentration of decaborane in the chosen silicon compound is necessary for obtaining a predetermined specific resistance of the precipitated silicon layer.

Figure 2:
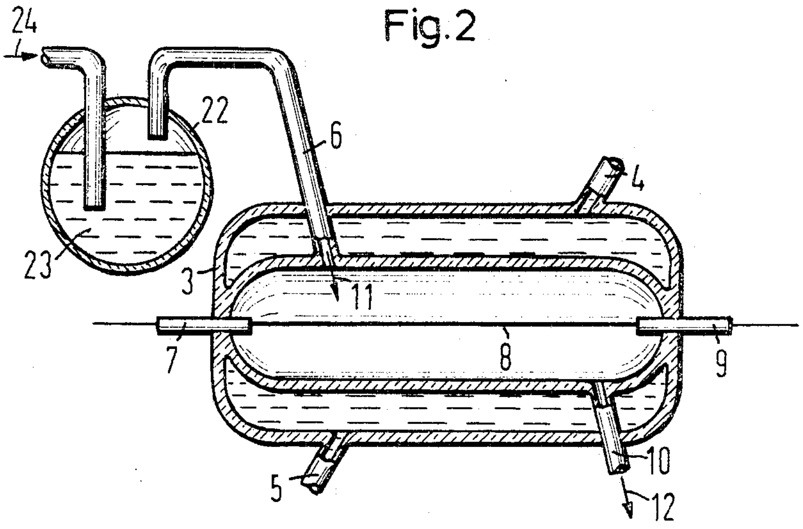
FIG. 2 illustrates a device for carrying out the method of the present invention.

FIG. 2 shows a double-walled quartz vessel 3 provided with conduits 4 and 5 to pass water between the walls of the vessel for cooling of the same, the walls closing the reaction chamber in which the thermal decomposition and the precipitation of the doped semiconductor material takes place. The evaporation vessel 22, which is maintained at constant temperature, contains a definite solution 23 of the decaborane in a compound of the semiconductor material to be precipitated, for example, in silicochloroform. By means of a carrier gas stream, symbolized by the arrow 24, an evaporated portion of the solution in which the ratio of decaborane to the compound of the semiconductor material to be separated always remains constant, is continuously passed through the inlet conduit 6, symbolized by the arrow 11, into the reaction chamber. On the heated carrier body or substrate 8 consisting of highly pure silicon, which in this example is shown in the form of a thin filament, the reaction gas mixture is decomposed, whereby silicon and boron precipitate onto the carrier body 8. The heating of the carrier body 8 to the necessary precipitation temperature, e.g., 1150° C., proceeds in this example by means of two electrodes 7 and 9 by direct current. The electrodes, consisting for example of tungsten, are melted directly into the walls of the reaction chamber. The remaining gas, symbolized by arrow 12, leaves the reaction chamber through the outlet conduit 10. Since the reaction gas is continuously streaming through the reaction chamber, the semiconductor precipitate continuously grows on the wire 8, so that after a time the same has been thickened to a thick rod, which can be worked up to semiconductor structural elements The above example can be varied in many ways. Thus, for example, it is particularly possible to have several carrier bodies, preferably arranged parallel to each other in the reaction chamber. The electrodes 7 and 9 can, at least in the inner part of the vessel, or also completely, consist of the material of the carrier body or of the semiconductor material to be precipitated.

Figure 3:
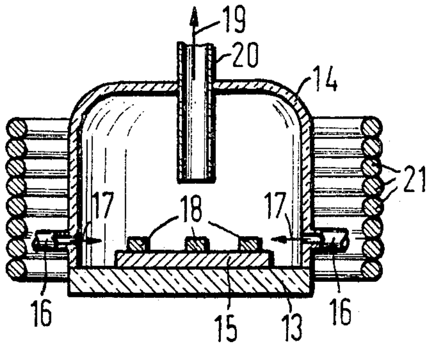
FIG. 3 shows another device for carrying out the method of the present invention.

If it is desired to coat discs with the semiconductor material, then the arrangement shown in FIG. 3, or a variation thereof, is particularly suitable for carrying out the method. As shown in FIG. 3, there is arranged on the base plate 13, which consists of quartz, and which is vacuum tight with the hood 14, which also is made of quartz, a plate 15, which preferably consists of the same material as the substrate 18, in this example of silicon. Through an opening 16 which is arranged in the side walls of the quartz hood 14, at about the height of the substrate or carrier body 18, is introduced the gaseous compound of the semiconductor material to be precipitated in definite mixture with the decaborane, due to evaporation of solution of the decaborane in the semiconductor material, the introduction thereof being symbolized by the arrow 17. The vaporized mixture is preferably introduced into the reaction chamber by means of a carrier gas and carried into the surface of the silicon discs 18. The evaporation vessel in which the solution of the decaborane in the silicon compound is carried out and from which the reaction gas mixture is taken, is not shown in the drawing.

The plate-shaped body 15 can be in any form whatsoever, for example, in the same form as the base plate 13 of the reaction vessel. The removal of the reaction gas from the reaction chamber, symbolized by arrow 19, occurs through conduit 20. The heating of the carrier body to the decomposition temperature is carried out by means of an induction coil 21 which is supplied with heat by a high frequency source which is not shown. The heating of the carrier body 18 to the precipitation temperature can also be carried out by heating of the plate-shaped body 15, which in such case is preferably U-shaped, and is heated by passage of direct current therethrough.

Particularly in the case of producing growing silicon layers, the arrangement shown in FIG. 3 can be changed so that for example, the reaction vessel consists entirely of a silicon. In this case, it is possible to do without a carrier body for the semiconductor bodies 18 which are to be coated. It is, however, necessary that the reaction vessel be provided with a quartz hood in order to avoid oxidation of the silicon vessel.

If it is desired to coat discs with p-germanium then it is also possible to gain calibration curves dependent on the conditions to be used. For example one finds by utilizing $GeCl_4$ for a liquid germanium compound and a separation temperature at about 820° C. that (a) 0.1 mg. $B_{10}H_{14}$ per cm.$^3$ $GeCl_4$ leads to germanium with $1\times10_{16}$ boron atoms and 0.4 ohm·cm. specific resistance at 20° C. and (b) 0.01 mg. $B_{10}H_{14}$ per cm. $GeCl_4$ leads to germanium with $1\times10_{15}$ boron atoms and 3.4 ohm·cm. specific resistance.

These informations are sufficient for obtaining the calibration curve for this example.

Although this invention has been described particularly with respect to the production of boron-doped semiconductor layers of silicon and germanium on mono-crystalline substrates, it is apparent that by obvious modification other semiconductor layers can be produced, and that the same can be produced on objects of any size and shape, and further that various other modifications can be made without departing from the spirit of the invention. Such modifications are accordingly meant to be comprehended within the scope of the appended claims.

I claim:

1. In the epitaxial method of growing monocrystalline homogeneously boron-doped semiconductor layers selected from the group consisting of silicon or germanium on a monocrystalline substrate by thermal dissociation of vapors of a compound of said semiconductor and of gaseous decaborane in a reaction chamber and precipitating the dissociated semiconductor material and boron onto a heated substrate in said reaction chamber, the improvement which comprises forming outside of the reaction chamber a solution of decaborane in a liquid halogen compound of said semiconductor vaporizing the thus formed solution, and supplying the resulting vapors of said solution into the reaction chamber.

2. Method according to claim 1 in which said compound of said semiconductor material is selected from the group consisting of silicon tetrachloride and silicochloroform.

3. Method according to claim 1 in which said vapors of said solution are introduced into the reaction chamber by means of a carrier gas.

4. Method according to claim 3 in which said carrier gas is hydrogen.

5. Method according to claim 1 in which said formed solution of decaborane in said liquid compound of said semiconductor material is a concentrated stock solution and in which the concentrated stock solution is diluted to a predetermined concentration corresponding to a predetermined desired resistance of the layered monocrystalline material, and the diluted solution is vaporized and thus supplied to the reaction chamber.

References Cited

UNITED STATES PATENTS

| | | | |
|---|---|---|---|
| 3,097,069 | 7/1963 | Reuschel | 117—106 XR |
| 3,172,857 | 3/1965 | Sirtl | 252—62.3 |
| 3,173,802 | 3/1965 | Patel et al. | 148—175 XR |
| 3,212,922 | 10/1965 | Sirtl | 117—106 |
| 3,321,278 | 5/1967 | Theuerer | 117—106 XR |
| 3,318,814 | 5/1967 | Allegretti et al. | 252—62.3 |
| 3,348,984 | 10/1967 | Pammer | 117—106 XR |

L. DEWAYNE RUTLEDGE, Primary Examiner

T. R. FRYE, Assistant Examiner

U.S. Cl. X.R.

106—286; 117—106, 201; 148—186; 252—62.3